July 17, 1951 A. T. KEENE 2,560,578
WASTE OR GARBAGE DISPOSAL APPARATUS
Filed April 9, 1945 3 Sheets-Sheet 1
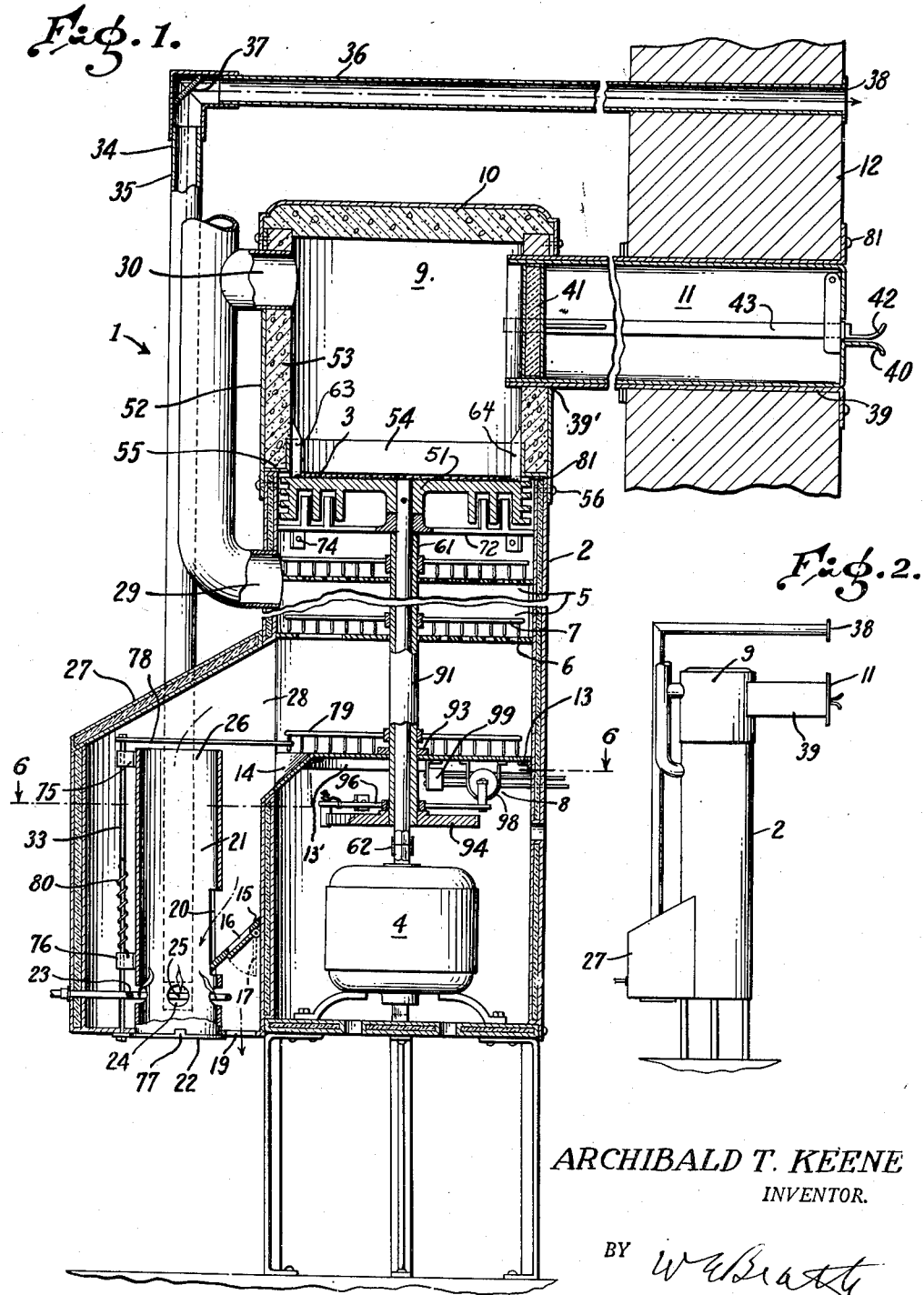
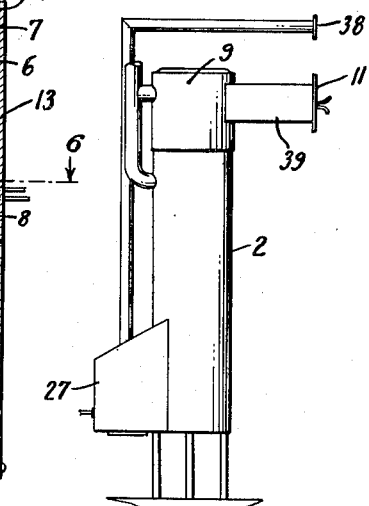
ARCHIBALD T. KEENE
INVENTOR.
BY
ATTORNEY

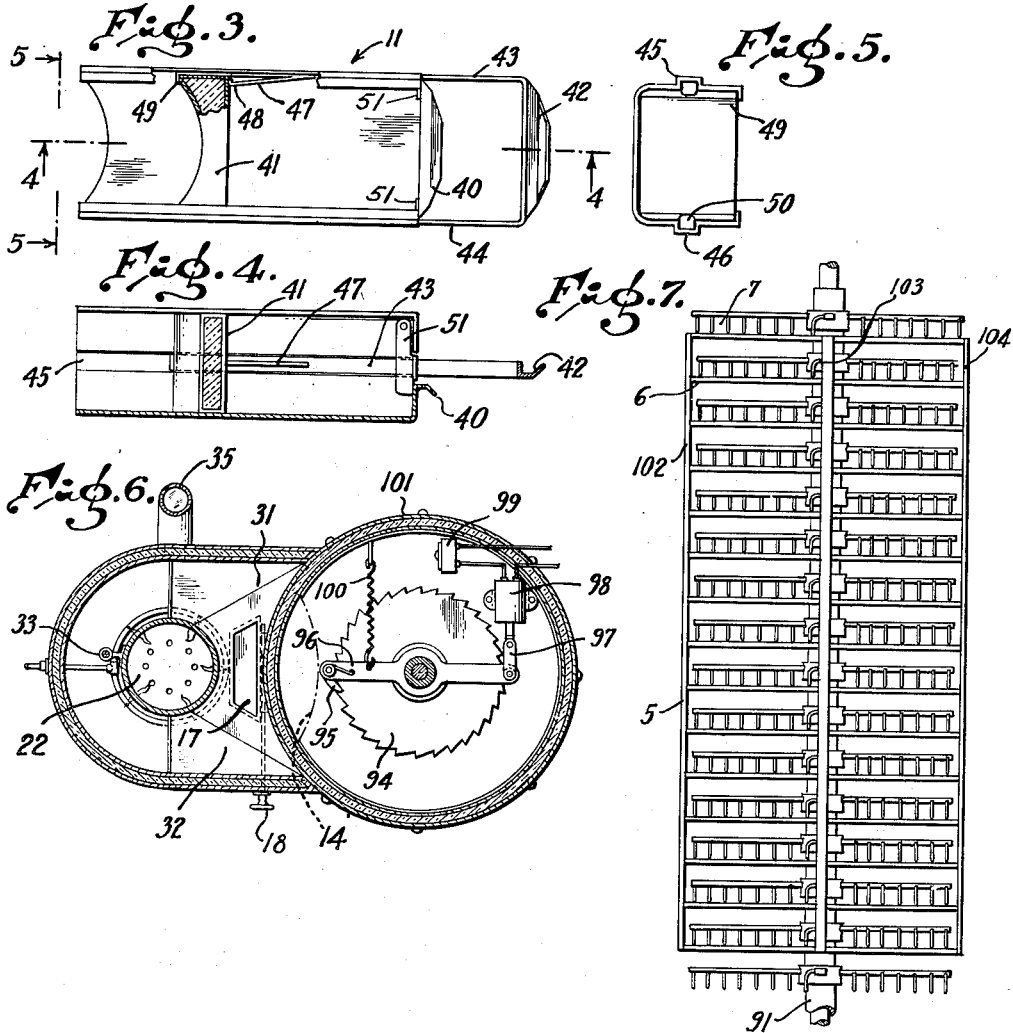

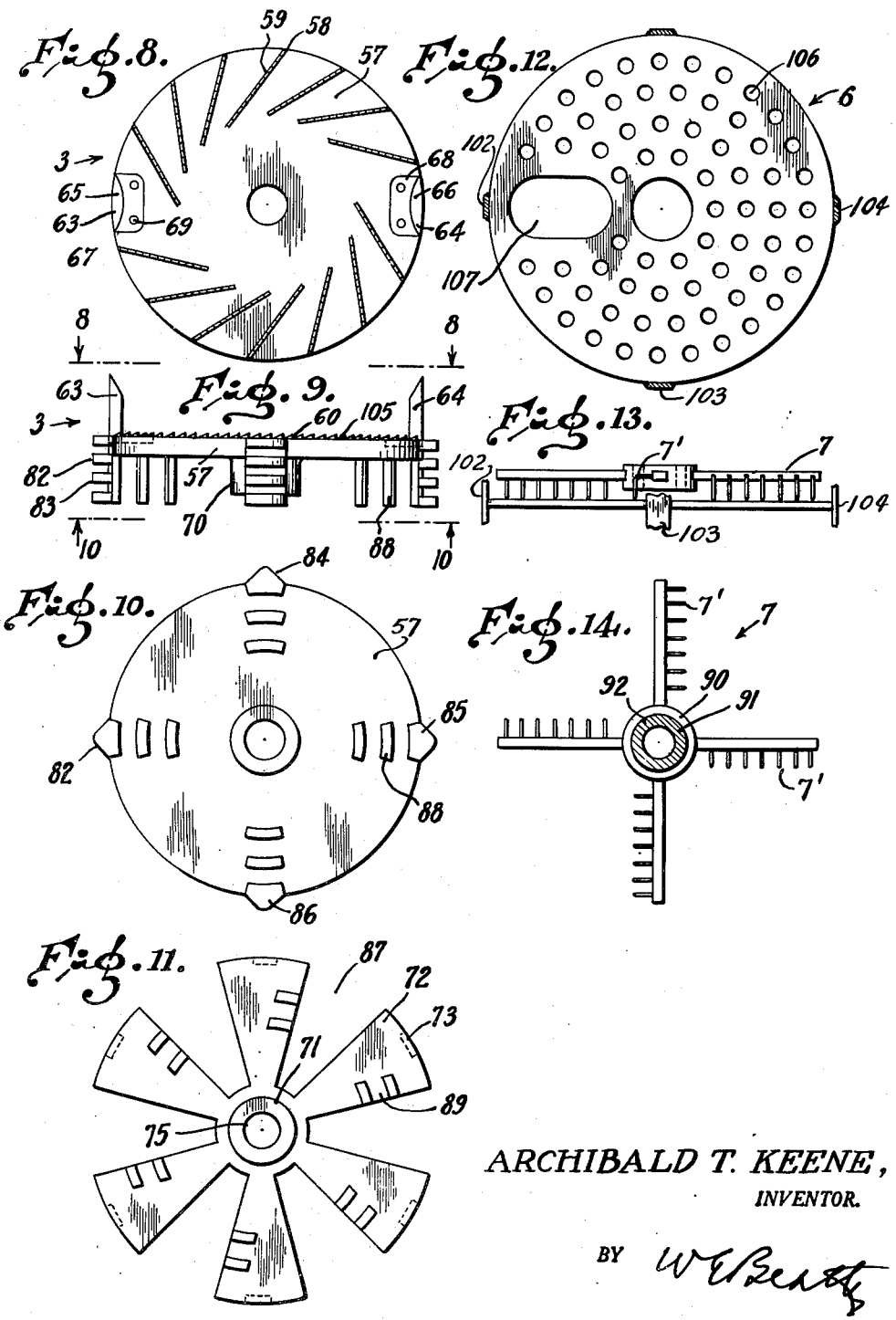

Patented July 17, 1951

2,560,578

UNITED STATES PATENT OFFICE 2,560,578

WASTE OR GARBAGE DISPOSAL APPARATUS

Archibald T. Keene, Southgate, Calif.; Enid Lois Keene administratrix of said Archibald T. Keene, deceased Application April 9, 1945, Serial No. 587,380

10 Claims. (Cl. 110—8)

The invention relates to improvements in waste or garbage disposal apparatus.

An object of the invention is to provide method and means for disposing of garbage at its source, substantially without smoke or unpleasant odor, while obviating the necessity of municipal transportation either before or after treatment.

Another object is to provide a home unit which produces from fresh garbage an end product which is either ash or desiccated garbage, both being of value, also clean to handle, free from unpleasant odor and useful as stock feed or fertilizer.

A further object is to provide a home disposal unit which is simple to install and is readily accessible on the outside of the dwelling for inspection and repair.

Another object is to provide a combined comminuting and desiccating unit having component parts which can be readily assembled or taken apart for ease of assembly and repair.

For further details of the invention reference may be made to the drawings, wherein:

Figure 1 is a longitudinal sectional view of waste or garbage disposal apparatus for carrying out the method of the present invention.

Fig. 2 is a view in side elevation on a reduced scale of the apparatus of Fig. 1.

Fig. 3 is a plan view of the drawer at the top of the apparatus in Fig. 1.

Fig. 4 is a sectional view on line 4—4 of Fig. 3.

Fig. 5 is a front end elevation of the drawer of Fig. 3, with the drawer on its side, looking in the direction of the line 5—5.

Fig. 6 is a sectional view on line 6—6 of Fig. 1.

Fig. 7 is a view in side elevation of the shelf and rake unit of Fig. 1.

Fig. 8 is a slightly magnified top plan view of the grinding element of Fig. 1, the view being taken on line 8—8 of Fig. 9 which is a view in side elevation of the grinding element.

Fig. 10 is a bottom plan view of the grinding element of Figs. 8 and 9, the view being taken on line 10—10 of Fig. 9.

Fig. 11 is a top plan view of a breaker plate arranged under the grinding element of Figs. 8 to 10.

Fig. 12 is an enlarged plan view of a typical desiccator plate for the apparatus of Figs. 1 and 7.

Fig. 13 is an enlarged view with parts broken away of a rake and plate of the unit in Fig. 7.

Fig. 14 is a plan view of the rake of Fig. 13, also Figs. 1 and 7.

Referring in detail to the drawings, the waste or garbage disposal apparatus 1 for carrying out the method of the present invention comprises a cylindrical housing 2 which houses at the top thereof a rotary comminuting or grinding element 3 driven by an electric motor 4 at high speed and a desiccator 5 having a plurality of shelves such as 6 each having a rake such as 7, driven at slow speed step by step by a separate motor 8. Rake 7 has suitable teeth which may be L-shaped as shown at 7' in Fig. 13. On the top of the housing 2 is a hopper 9 having a cover 10. Communicating with the hopper 9 is a drawer 11 which may extend through the wall 12 of the dwelling so as to be accessible at the front of the wall 12.

The motor 4 is provided with a cover comprising a flat top 13 which may serve as the lowermost shelf of the desiccator. The top 13 at one side is cut away and secured thereto is a sloping portion 14 which serves as the chute for the desiccated material. Top 13 is removably supported on a circular flange 13' secured to the inside of housing 2. The desiccated material from top 13 drops onto a shelf 15 provided with an opening 16 and a valve 17. When the valve 17 is opened by the handle 18 shown in Fig. 6, the desiccated material falls through the opening 16 and through the opening 19 to a suitable receptacle, not shown, therebelow. When the valve 17 is closed, the desiccated material is guided through the opening 20 in the receptacle 21, which may serve as a furnace, and such comminuted material piles up on the grate 22 of the furnace until the pile reaches a level adjacent the flame of the gas or other burner 23, whereupon the comminuted material burns, more-or-less like punk, substantially without smoke or unpleasant odor for reasons hereafter explained. The furnace 21 is provided with a circular array of apertures such as 24, and the burner 23 is a manifold arranged around the outside of the furnace 21 with a gas jet such as 25 adjacent each of the apertures 24. Air for the flames of the burner 23 passes through the grate 22 or through opening 19 and through the openings 24 and then out through opening 20 and through the open top 26 of the furnace 21. The furnace 21 is mounted in a housing extension 27 at one side of the casing 2 and the side of casing 2 has an opening 28 through which the heated air from the furnace 21 passes on its way through the desiccator 5 to dry the comminuted garbage, and then out the vent 29 at one side of the desiccator or out the vent 30 at one side of the hopper 9.

The shelf 15 extends to the sides of the housing extension 27, as indicated at 31 and 32 in Fig. 6, with the result that the air passing to the burner 23 through opening 19 enters inside of the furnace 21 and in so doing deflects the flames of the burner 23 inside of the furnace 21, even though the burner 23 itself is outside of the furnace 21. The advantage of this arrangement is that if an excess of moisture or water from the hopper 9 should flow down the chutes 14 and 15, such moisture will not reach the burner 23 and put out the flame.

The grate 22 is connected to a shaft 33 mounted for pivotal movement by brackets 75, 76 at one side of the furnace 21. The grate 22 is slightly larger in diameter than the bottom of the furnace 21 and is provided at its opposite sides with stop lugs such as 77 which limit its swinging movement so that it cannot uncover the bottom of furnace 21. Shaft 33 is connected to an arm 78, the outer end of which extends in the path of movement of the bottom-most rake 79 so that each time one of the arms of the rake 79 comes opposite the furnace 21, such rake arm will strike the arm 78 and shake the grate 22 to remove the ashes in the bottom of furnace 21. The rake 79 moves in a counter-clockwise direction and moves the arm 78 clockwise against the action of the spring 80 so that after the rake arm has passed the end of arm 78, the spring 80 restores the grate to its initial position with stop 77 against the bottom of furnace 21. The motor 8 for the rakes 7 and 79 may remain constantly operative, and thereby the tendency of furnace 21 to produce smoke is substantially eliminated because the continual operation of the grate 22 insures that only a thin bed of ashes will remain on the grate so that the desiccated material dropping from shelf 15 will not become imbedded and smolder in a thick bed of ashes. Also, the continual operation of the rakes 7 and 79 insures that the desiccated material is fed slowly to the furnace 21 so as to give it time to burn without smoldering in a large pile.

In order to see from the inside of wall 12 whether the burner 23 is lit, use may be made of a periscope 34 comprising a sight-tube 35, the lower end of which is in line with the flame from burner 23, and a sight-tube 36 optically connected therewith by a mirror 37, the tube 36 extending through the wall 12 and having an open end 38 for viewing the flame.

The drawer 11 is mounted in a casing 39 removably secured in the wall 12 by bolts 81. Casing 39 slidably extends through an opening 39' in the side of the hopper 9.

As shown in Figs. 3 to 5, the drawer 11, which may be made of sheet metal, is provided with a handle 40. Slidable in the drawer 11 is a pusher 41 operated by a handle 42 connected with parallel flat push rods 43 and 44, slidably mounted in grooves 45 and 46, extending lengthwise across the middle of the sides of the drawer 11. Each of the pusher rods 43 and 44, as indicated for rod 43, carries a spring detent such as 47, having an offset portion 48 to push the follower or pusher 41 forward to eject garbage from the drawer 11 into hopper 9 when the handle 42 is pushed fully forward. The push rods 43 and 44 at their left ends, each have an inturned portion 49, 50 which extend across the front of the pusher 41 to pull it back when the handle 42 is pulled out. In order to leave the pusher 41 at the inner right end of drawer 11 even though the handle 42 is pushed in, at each side of the front of the drawer 11 is mounted a pivoted plate such as 51 which extends against the inside of the drawer 11 in position to engage the spring detent like 47 and push it out to a position where its offset end 48 will pass by the side of the pusher 41 when the handle 42 is pushed in. In the use of the drawer 11, of course the drawer is pulled out when it is desired to deposit waste kitchen products or garbage therein, and if the pusher 41 is not at the right end of drawer 11, it is moved to that position by pulling out the handle 42 so that the waste products are deposited in front of the pusher 41. The pusher 41 is then moved forward by hand a short distance to thereby carry the rods 43, 44 forward to a position where the spring catch 47 is released from the pivoted arm 51, the end 48 of the catch 47 then extending in front of the pusher 41 so that thereafter the pusher 41 may be advanced to the end of its stroke by pushing on the handle 42. Then the handle 42 is pushed in, whereby the material in the drawer is discharged therefrom into the hopper 9. If it is desired at that time to move the pusher 41 to the front of the drawer, without pulling out the drawer, this can be done by fully pulling out the handle 42 and pushing it in again. If it is desired to wash out the drawer 11 and its associated parts, the drawer may be removed from its housing 39 and the pusher 41, handle 42 and push rods 43—44 may be ejected from the left end of the drawer by moving the pivoted arms like 51 upwardly so that the parts just named will slide out of the left end of drawer 11.

The grooves 45 and 46 may be formed by stamping them out of the sides of the drawer and these stamped-out portions serve as ridges or rails which slide in companion grooves, not shown, in the opposite sides of the casing 39.

No doubt the reason that the word "garbage" connotes something obnoxious is because of the obnoxious odor it acquires after it has been allowed to stand for several days or long enough to decay. The present invention provides method and means for converting garbage into an end product which is substantially free from unpleasant odor and this is accomplished without thereby either producing an unpleasant odor or a substantial amount of smoke. The invention provides an end product which may be either ash which, of course, has a very small volume in proportion to the volume of the original material, or an end product which comprises desiccated, comminuted garbage in the form of dried discrete flakes or particles, which generally resemble smoking tobacco in appearance. The following are the reasons why smoke and unpleasant odor are substantially eliminated by the present invention.

In the first place, it is assumed that the apparatus is fed with garbage which is fresh, it being convenient to do so as the drawer 11 is accessible in the kitchen, and in fact, vegetables may be peeled directly into it. In the case where the end product is to be ashes, with valve 17 closed, the reason that smoke and unpleasant odor are not produced is that the fire box, that is, the depth of combustion chamber below the flame aperture 24 is very shallow, and hence, only a shallow bed of ashes can be built up on the grate. Also, the grate is constantly in operation, and hence, the ashes are continually removed so that at any one time there is only a shallow bed of ashes, whereby fresh desiccated material dropping in the furnace 21 arrives in burning relation to the flame and exposed to the air without dropping into a thick bed of ashes where it would likely smolder and produce smoke. Also, the rakes 7, 79 are continually in operation at low speed with the result that only a small quantity of the desiccated material is fed to the burner 23 at any one time, the quantity of fuel being quite small as the furnace is small, in comparison to the desiccator so that plenty of oxygen is available for its combustion without producing smoke.

In the case where the end product is to be desiccated garbage, with valve 17 open the reason that smoke is not produced is because the garbage is desiccated without being burned. Also, the desiccation takes place over a long period of time so that the result of this is simply to reduce the moisture content in the desiccated material.

The hopper 9 may comprise a cylindrical casing 52 lined with concrete 53 and having a metal circular flange 54 lining its lower end, with an end flange 55 which rests on the top of the casing 2 and removably secured thereto by suitable means such as bolts 56. Arranged at the top of the casing 52 adjacent the lower end of the hopper 9 is a circular grinding or comminuting device 3, which is shown in Figs. 8 and 9, and comprises a circular plate 57 having a plurality of non-radial slots such as 58 which may be milled in the top of plate 57 and a piece of hack saw blade 59 is set on edge in each slot 58 and suitably secured therein by sweating or otherwise, with the teeth of the blade projecting above the top of the plate 57, as indicated at 60, and with the valley 105 of the teeth on a level with the top of the plate so that that portion of the hack saw blade 59 which has no teeth is imbedded in the plate 57 to avoid providing an abutment which would not be effective to grind or cut the garbage material. The grinder 3 is secured to a shaft 61 which is coupled by a removable coupling 62 to the electric motor 4 which drives the grinder 3 at high speed such as 1800 R. P. M.

Arising from opposite sides of the grinder plate 57, in scraping relation to the liner 54 is a pair of scraping blades 63 and 64 which have an arcuate periphery 65, 66 rotatably fitting in the flange 54. The blades 63 and 64 have a right angle foot piece 67, 68 suitably secured to the plate 57 by means such as screws 69, with the top of the foot piece 67, 68 flush with the top of the plate 57. The plate 57 on its underside has a boss or end bearing 70 which is rotatably supported by a boss 71 on a stationary plate 72 secured to casing 2 by depending flanges such as 73, which are secured to the casing by means such as bolt 74. The boss or thrust bearing 71 has a central aperture 75 serving as a bearing for the upper end of the shaft 61.

The grinder plate 57 is supported so that its top extends slightly below the lower end of flange 54, thereby leaving an annular opening 81 through which the comminuted particles are projected by centrifugal force from the grinder to the interior of the top of casing 2. From that position such particles, usually having a high moisture content so that they will form an adherent mass, are scraped by the scraping elements like 82 shown in Fig. 9. Each set of the scraping elements 82 comprises a plurality of spaced scraper members, one of which is indicated at 83, and four sets of the scraping elements 82 are illustrated in Figs. 9 and 10 at 82, 84, 85, 86. The material then drops onto plate 72 and through the sector openings such as 87 in that plate. As the material drops onto one of the sectors of plate 72 it is removed therefrom by stirring or breaker elements such as lugs 88 depending from grinder plate 57 as shown in Figs. 9 and 10, four sets of elements 88 being shown, and each set interleaving with a set of stationary abutments or lugs 89, one set being shown on each of the sectors of the plate 72. The material then proceeds from shelf to shelf by gravity down the desiccator 2.

As the discharge opening 81 is annular, it has been found that stringy material such as a carrot stalk will find its way through that aperture without being broken up or comminuted and it will be wound around the shaft 61. This is prevented by the depending spaced lugs 88, on the grinder plate 57, which rotate between the stationary lugs 89 which serve to break up such stringy material into small pieces.

As shown in Fig. 14, each rake such as 7, 79 comprises a plurality of arms, four being shown, connected to a collar 90 secured to a hollow shaft 91 by a set screw 92. The grinder shaft 61 is coaxial with and rotatably mounted in the rake shaft 91. Rake shaft 91 is rotatably supported on the shaft 61. The lower end of rake shaft 91 is rotatably supported by a collar 93 which rests on the top 13. The hollow shaft 91 projects through the top 13 and to its lower end is secured a ratchet wheel 94 driven by a pawl 95 carried at one end of arm 96, the other end thereof being connected by a link 97 to a solenoid 98 in circuit with a bimetallic thermal switch 99 in circuit with a source of current, not shown. The intermediate portion of arm 96 is loosely mounted on the hollow shaft 91 and the pawl 95 and arm 96 are held in retracted position by a tension spring 100, one end of which is connected to the arm 96 and the other end to the casing 2, as indicated at 101. Switch 99 intermittently opens and closes to periodically energize solenoid 98 and actuate the rakes 7, 79.

The various shelves 6 are held in spaced relation by four radially spaced and longitudinally extending metal strips such as 102, 103, 104 in Fig. 7. Each shelf 6 has a series of small sieve or classifying openings 106 and a larger opening 107 staggered with respect to the similar openings like 107 in the lower shelves. Aperture 107 serves as a vent for heated air from burner 23 and from furnace 21 if the desiccated material is burned. Holes 107 also provide a discharge opening for permitting a ball of the comminuted material to drop to the next shelf, the material at the top of the desiccator 2 having a tendenecy to ball up due to its high moisture content, but becoming flaky or granular with no ball after passing a few of the shelves. If the comminuted particles, even though wet, are small enough, and when desiccated, pass through the sieve openings 106 which may be coarser for upper shelves and smaller for lower shelves.

The rake and shelf assembly shown in Fig. 7 is a separate removable or insertible unit and it is constructed by slipping one of the shelves 6 over the hollow shaft 91, then slipping the rake collar 90 over shaft 91 and securing the rake collar in position and continuing to slip the various shelves and rakes on the hollow shaft 91, securing the rakes to the hollow shaft by set screws like 92 and securing the shelves in spaced relation by the straps 102 to 104 which may be welded or otherwise secured to the shelves.

The shelf and rake assembly shown in Fig. 7 comprises a separate unit which may be inserted into or removed from casing 2 as a unit, in fact, with some elements later described connected with it. For example, if it is desired to remove the shelf and rake assembly shown in Fig. 7 from casing 2, the vent pipes 29 and 30 are pulled out and the casing 39 is pulled out from hopper 9, which can be removed by means of the pins or bolts 56. The motor coupling 62 is preferably a slip coupling so that the grinder 3 and its shaft 61 may now be removed lifting them out. Then the stationary plate 72 and bolt 74 are removed, whereupon the rake and shelf assembly with shaft 91, plate 13 together with solenoid 98 and thermal switch 99 attached to the underside of plate 13, also pawl and ratchet 94, 95, 96 mounted on hollow shaft 91 may be pulled out from the casing 2. The parts just described may be assembled in the reverse order.

It will be apparent that various modifications may be made in the present invention without departing from the spirit of the following claims.

I claim:

1. A cylindrical housing, a series of drying shelves within said housing, a pair of shafts one within the other and extending vertically through the center of said shelves, rakes for said shelves mounted on the outer shaft, a grinder comprising a disk mounted on the upper end of the inner shaft in discharge relation to said shelves, abrasive means on the upper surface of said disk, and driving means individual to said outer and inner shafts for driving said inner shaft at a high speed and said outer shaft at a low speed.

2. A cylindrical housing, a shelf unit having a plurality of shelves, a vertical hollow shaft extending through the center of the shelves of said unit, rakes mounted on said hollow shaft between said shelves and in raking relation thereto, said shelf unit, hollow shaft and rakes comprising a unit removably fitting in said housing, an inner shaft rotatably and slidably fitting in said hollow shaft, a grinding device above said shelf unit on said inner shaft, a bearing removably supporting each of said shafts, and a power drive individual to and removably coupled with each of said shafts.

3. Desiccating apparatus comprising a desiccator having a plurality of spaced shelves each having a plurality of apertures, a rake for each of said shelves, a hopper at the top of said desiccator, a comminuting device in the bottom of said hopper and at the top of said desiccator, a motor below said desiccator, a shaft connecting said motor to said comminuting device, a hollow shaft on said first shaft, a rake for each of said shelves connected to said hollow shaft, and means for rotating said hollow shaft.

4. Comminuting and desiccating apparatus comprising concentric shafts one of which is a high speed shaft and the other a low speed shaft, a power drive individual to each of said shafts, a comminuting device on said high speed shaft, a desiccator below said comminuting device to receive discharges therefrom, and an agitator for said desiccator on said low speed shaft.

5. Desiccating apparatus comprising a cylindrical casing, means for projecting comminuted material by centrifugal force on the interior of said casing at the top thereof, a plurality of spaced perforated shelves in said casing, means for removing from the inside of the said casing the comminuted material projected thereon by said first means, to permit such material to drop in said casing toward said shelves, means in the path of material removed by said last-mentioned means for breaking up an elongated strip or piece of material, and desiccating means in said casing.

6. Garbage disposal apparatus comprising a hopper, a rotary comminuting device at the bottom of said hopper, a desiccator below said hopper, said hopper having an aperture above and around said rotary device to pass comminuted material projected from said rotary device by centrifugal action, said desiccator having an inlet communicating with said aperture, means on said rotary device for agitating comminuted material adherent at said inlet to cause the same to drop into said desiccator, said desiccator comprising a plurality of superposed shelves each having a series of comparatively small apertures through which finely divided particles may fall, each shelf having a comparatively large aperture to serve as a flue for heated air and also to serve as an outlet for a mass of comminuted material too large to pass through said smaller apertures, the apertures in adjoining shelves being staggered, a rotary rake for each of said shelves, means for rotating said rakes, means for rotating said rotary comminuting device, the bottom of said desiccator having an outlet for desiccated material and an inlet for heated air, a burner below said inlet, and a chute for said outlet for guiding desiccated material to said burner.

7. Desiccating apparatus comprising a desiccator having a plurality of spaced shelves each having a plurality of apertures, a rake for each of said shelves, a hopper at the top of said desiccator, an abrasive disk serving as the bottom of said hopper and as the top of said desiccator, said disk having a top edge spaced from said hopper to provide a restricted circular outlet leading into said desiccator, means for rotating said rakes at a comparatively slow speed, and means for rotating said disk at a higher speed.

8. Comminuting means, a desiccator therebelow and having an inlet to receive comminuted material from said comminuting means by gravity, said desiccator comprising a casing having therein an assembly of vertically spaced apertured drying shelves, a burner and chimney therefor at one side of and below said desiccator, a flue for leading hot combustion gases from said burner and chimney into the lower end of said casing, and means comprising said flue for feeding desiccated material from said desiccator by gravity to said burner.

9. A high speed grinder, means for supplying thereto garbage such as kitchen waste products including bone and vegetable matter having a high moisture content, said grinder comprising a casing and an abrasive disk therein for comminuting the garbage and projecting the comminuted garbage by centrifugal force on the inside of said casing to form an adherent mass of comminuted particles, adherent by reason of the moisture content, means for desiccating said mass, said disk having peripheral scraping elements for removing said mass from the inside of said casing and feeding the same to said desiccating means, and means for sifting the desiccated mass to form desiccated, discrete, non-adherent garbage particles, generally resembling smoking tobacco.

10. A garbage burner comprising a furnace receptacle having a lower portion having a side wall and serving as a combustion chamber having a flame opening adjacent the top of said combustion chamber, a gas manifold having a gas port outwardly spaced from the outside of said wall and adjacent said flame opening, means for dropping desiccated comminuted garbage into said receptacle, said receptacle having an upper portion comprising a flue for creating a draft to deflect the flame from said manifold from the outside to the inside of said wall through said opening into said combustion chamber.

ARCHIBALD T. KEENE.

REFERENCES CITED

The following references are of record in the file of this patent:

UNITED STATES PATENTS

| Number | Name | Date |
| --- | --- | --- |
| 237,080 | Mercer | Jan. 25, 1881 |
| 241,653 | Harrison | May 17, 1881 |
| 551,342 | Wentworth | Dec. 10, 1895 |
| 1,194,385 | Hoover | Aug. 15, 1916 |
| 1,449,958 | Schifferdecker | Mar. 27, 1923 |
| 1,769,003 | Strube | July 1, 1930 |
| 2,015,052 | Hartley | Sept. 17, 1935 |
| 2,033,757 | Crites | Mar. 10, 1936 |
| 2,075,506 | Crites et al. | Mar. 30, 1937 |
| 2,102,427 | Lloyd et al. | Dec. 14, 1937 |
| 2,118,208 | Lewers | May 24, 1938 |
| 2,166,351 | Hagen | July 18, 1939 |
| 2,171,535 | Berg et al. | Sept. 5, 1939 |